United States Patent [19]

Chavez, Jr. et al.

[11] Patent Number: 6,018,665
[45] Date of Patent: Jan. 25, 2000

[54] WIRELESS TERMINAL WITH AUXILARY DESKTOP UNIT

[75] Inventors: David L. Chavez, Jr., Thornton; Gary L. Griffith, Arvada, both of Colo.; Wilfred E. Lehder, Jr., Rumson, N.J.; Joseph C. Rorick, Jr., Longmont, Colo.; Michael J. Stima, Bridgewater, N.J.

[73] Assignee: Lucent Technologies, Murray Hill, N.J.

[21] Appl. No.: 08/904,383

[22] Filed: Aug. 1, 1997

[51] Int. Cl.[7] .................................................. H04M 11/00
[52] U.S. Cl. ........................... 455/462; 455/575; 455/556
[58] Field of Search .................................. 455/445, 462, 455/465, 551, 556, 557, 560, 11.1, 575

[56] References Cited

U.S. PATENT DOCUMENTS

| | | |
|---|---|---|
| 4,853,951 | 8/1989 | Bauer . |
| 4,989,230 | 1/1991 | Gillig et al. .............................. 455/462 |
| 5,010,565 | 4/1991 | Nash et al. . |
| 5,426,689 | 6/1995 | Griffith et al. . |
| 5,598,459 | 1/1997 | Haartsen ................................. 455/11.1 |
| 5,839,075 | 11/1998 | Haartsen et al. ........................ 455/465 |

*Primary Examiner*—Doris H. To
*Attorney, Agent, or Firm*—John C. Moran

[57] ABSTRACT

Providing by a wireless terminal the sole communication link to a wireless telecommunication switching system, and inserting the wireless terminal into an auxiliary desktop unit to provide the full functional capabilities of a business telecommunication terminal. The result is that a user has one telephone number for the wireless terminal, and yet, when the wireless terminal is inserted into the auxiliary unit, the user is provided the full capabilities of a modern business telecommunication wired terminal. Also, no wired telephone links must be installed since the wireless terminal communicates solely over a wireless media.

22 Claims, 6 Drawing Sheets

WIRELESS TERMINAL WITH AUXILARY DESKTOP UNIT

TECHNICAL FIELD

This invention relates to wireless telecommunication terminals, and, in particular, to the provision of sophisticated desktop functions for a wireless terminal.

BACKGROUND OF THE INVENTION

In prior art business telecommunication switching systems that provide for both wireless and wired telephone terminals, a problem exists in that users have both a wireless terminal and a wired terminal. Each of these terminals has a different telephone number. The problem is that to reach a user a caller must call both numbers if the user does not answer at the first called number. Prior art systems have attempted to solve this problem by utilizing call coverage where the call is first placed to the wired terminal, then, if that terminal does not answer, the call is transferred to the wireless terminal. The problem with this solution is that the call must first ring the wired terminal before it is transferred to call coverage at the wireless terminal. In addition, the user must have two complete terminals.

Further, a major cost in wired business telecommunication systems is the cost of installing the telephone links (telephone wires) to interconnect the wired terminals to the business telecommunication switching system. Not only is the initial cost high for installing the telephone links but subsequent maintenance and re-locations add to this cost. Wireless terminals do not have the cost of the telephone links; however, by their portable nature, wireless terminals are reasonably simple devices or have extremely tiny buttons to provide more sophisticated telephone features. Whereas, users accept the limitations of the wireless terminals while they are away from their desk; it is highly desirable that when a user is sitting at their desk that they have a full functional business telephone terminal.

One solution in the prior art to this problem is to have a cordless phone that shares the same telephone link with a business telephone terminal. In this manner, if the user is away from their desk and has the cordless telephone, they can answer calls directed to their wired business telephone terminal. The disadvantage with this system is that the cordless telephone has limited range and does not function well where there are large numbers of cordless telephones due to the limitations in communication bandwidth.

SUMMARY OF THE INVENTION

The foregoing problems are solved, and a technical advance is achieved by an apparatus and method in which a wireless terminal provides the sole communication link to a wireless telecommunication switching system, and the wireless terminal can be interconnected to an auxiliary desktop unit that provides the full functional capabilities of a business telecommunication terminal. Advantageously, the invention allows the user to have one telephone number for the wireless terminal, and yet, when the wireless terminal is interconnected to the auxiliary unit, the user is provided the full capabilities of a modern business telecommunication wired terminal. Also, no wired telephone links must be installed since the wireless terminal communicates solely over a wireless media.

Other and further aspects of the present invention will become apparent during the course of the following description and by reference to the accompanying drawing.

DETAILED DESCRIPTION

Figure 1:
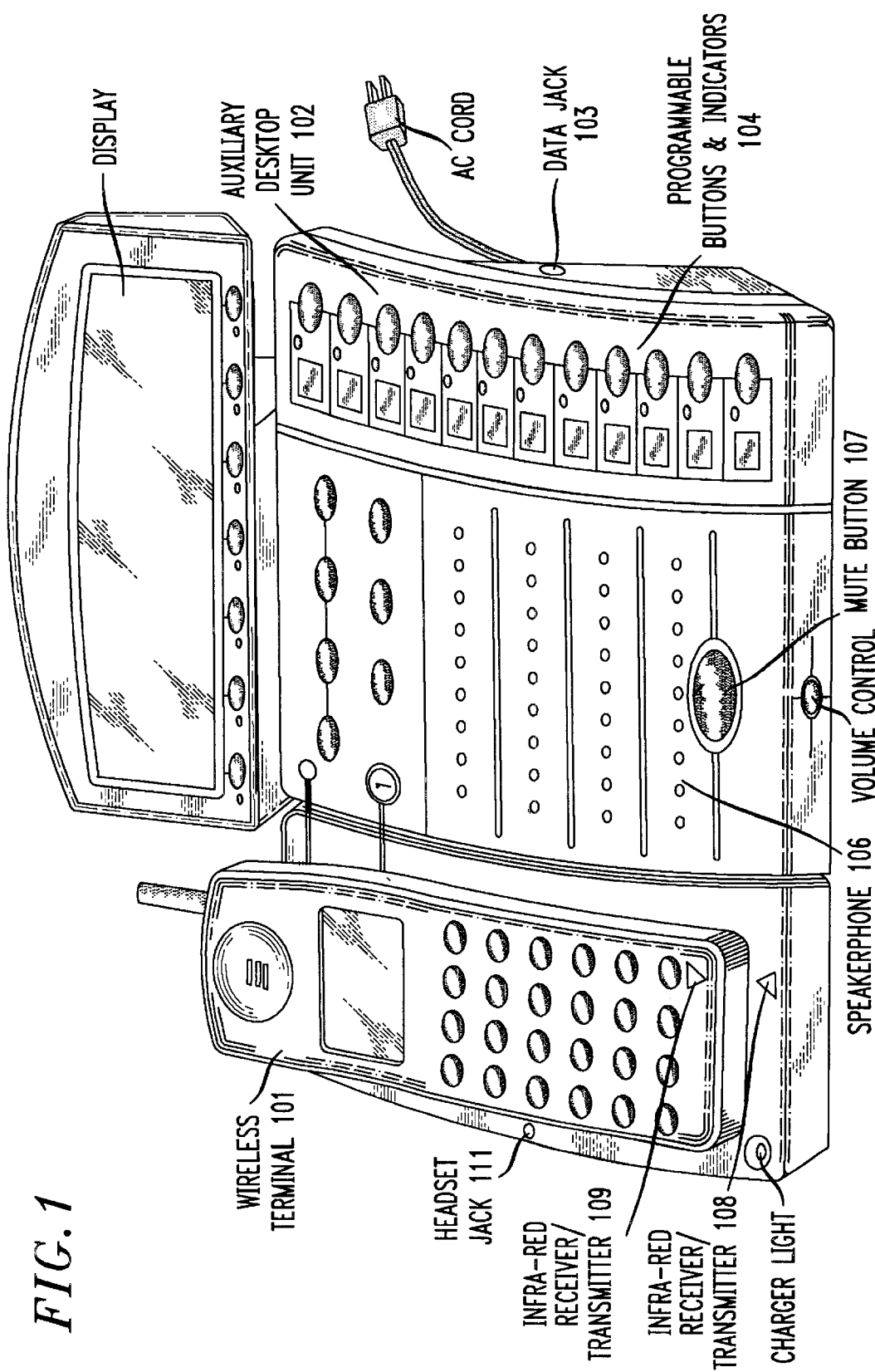
FIG. 1 illustrates a conceptual view of a wireless terminal inserted into an auxiliary desktop unit in accordance with the invention.

FIG. 1 illustrates wireless terminal 101 inserted into auxiliary desktop unit 102. All voice, data, and control information communicated between wireless terminal 101 and auxiliary desktop unit 102 is communicated by wireless terminal 101 to a wireless telecommunication switching system not illustrated in FIG. 1. Data and control information is communicated between wireless terminal 101 and auxiliary desktop unit 102 by infra-red receiver/transmitter 109 in wireless terminal 101 and infra-red receiver/transmitter 108 in auxiliary desktop unit 102. Auxiliary desktop unit 102 provides standard programmable buttons and indicators 104 that are programmable to provide different telephone features and speed dialing. In addition, auxiliary desktop unit 102 provides speakerphone 106 as a built-in function as well as data jack 103 which can access a remote computer via a data path through wireless terminal 101 and the wireless telecommunication switching system. Also provided, is functional display 112 that is utilized for such things as caller ID information, feature procedures, and internet access. In addition, auxiliary desktop unit 102 provides a battery charger to charge the battery of wireless terminal 101 when wireless terminal 101 is inserted into auxiliary desktop unit 102.

Figure 2:
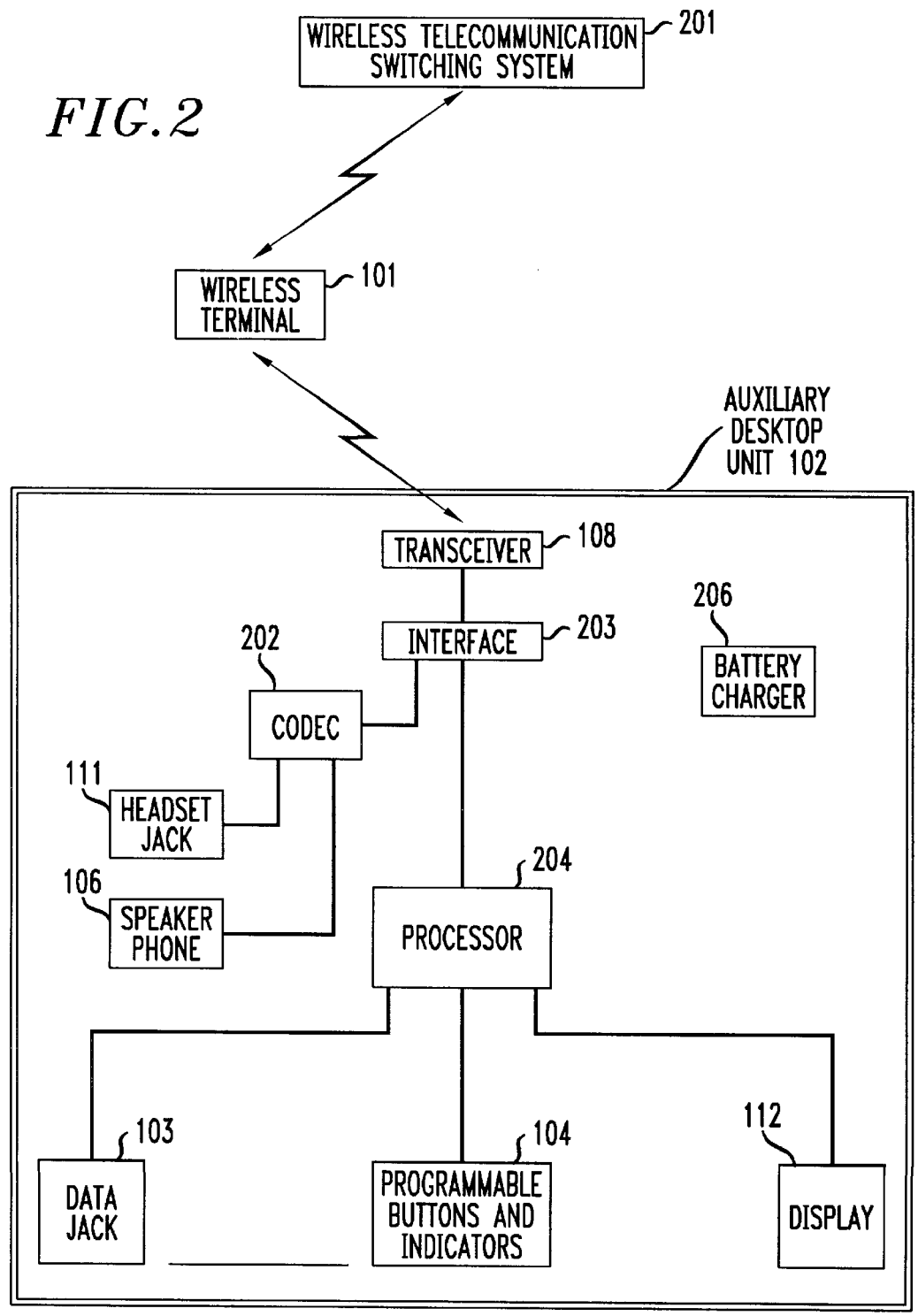
FIG. 2 illustrates, in block diagram form, the interconnection of the wireless terminal to a wireless telecommunication switching system and also to an auxiliary desktop unit.

FIG. 2 illustrates a block diagram illustrating the interconnection between wireless telecommunication switching system 201, wireless terminal 101, and auxiliary desktop unit 102. Auxiliary desktop unit 102 is shown in greater detail in FIG. 2. Wireless terminal 101 is shown in greater detail in FIG. 3. Wireless terminal 101 performs all the call control and high level processing of messages from wireless telecommunication switching system 201. Wireless telecommunication switching system 201 is unaware of whether wireless terminal 101 is operating by itself or is communicating with auxiliary desktop unit 102. Communication of information between wireless terminal 101 and auxiliary desktop unit 102 is via infra-red transceivers 108 and 109. One skilled in the art could readily envision other types of wireless links. Wireless terminal 101 maintains a control channel, a voice channel, and a data channel with auxiliary desktop unit 102 via the infra-red link. The protocol used on the infra-red link can be any number of well known protocols. Within auxiliary desktop unit 102, interface 203 disassembles and assembles information being communicated on the infra-red link set up between transceivers 108 and 109. The voice information is routed to or from voice codec 202 for use either by speakerphone 106 or a headset plugged into headset jack 111. Data information is routed to or from a data device connected on data jack 103. Control information is communicated by interface 203 with processor 204.

The control information is utilized by processor 204 to control the operations of display 112 and the indicators on subunit 104. Actuation of a programmable button causes processor 204 to transmit control information via interface 203, transceiver 108, and transceiver 109, to wireless terminal 101. Wireless terminal 101 is responsive to this control information to form a high level PHS message that specifies which programmable button has been actuated. Similarly, wireless telecommunication switching system 201 transmits control information to wireless terminal 101 specifying which indicator on auxiliary desktop unit 102 is to be turned on via a high level PHS message. Wireless terminal 101 decodes the PHS message from wireless telecommunication switching system 201 and sends a message via the control channel of the infra-red link to processor 204 specifying that the indicator is to be lit. Wireless telecommunication switching system 201 processes the control information from auxiliary desktop unit 102 to provide features and other telephony operations using techniques well understood by those skilled in the art.

When wireless terminal 101 is remote from auxiliary desktop unit 102 and is not maintaining communication via the infra-red link, wireless terminal 101 maintains a record of the messages sent from wireless telecommunication switching system 201 designating which indicators are to be turned on or off. Upon establishing communication with auxiliary desktop unit 102, wireless terminal 101 transmits messages to processor 204 updating the status of the indicators. Similarly, wireless terminal 101 upon reestablishing communication updates display 112. Whether wireless terminal 101 is in communication with auxiliary desktop unit 102 or not, wireless telecommunication switching system 201 communicates control information with wireless terminal 101 in the same way. Advantageously, no feature operations need be modified to add wireless terminal 101 and auxiliary desktop unit 102 to wireless telecommunication switching system 201.

Figure 3:
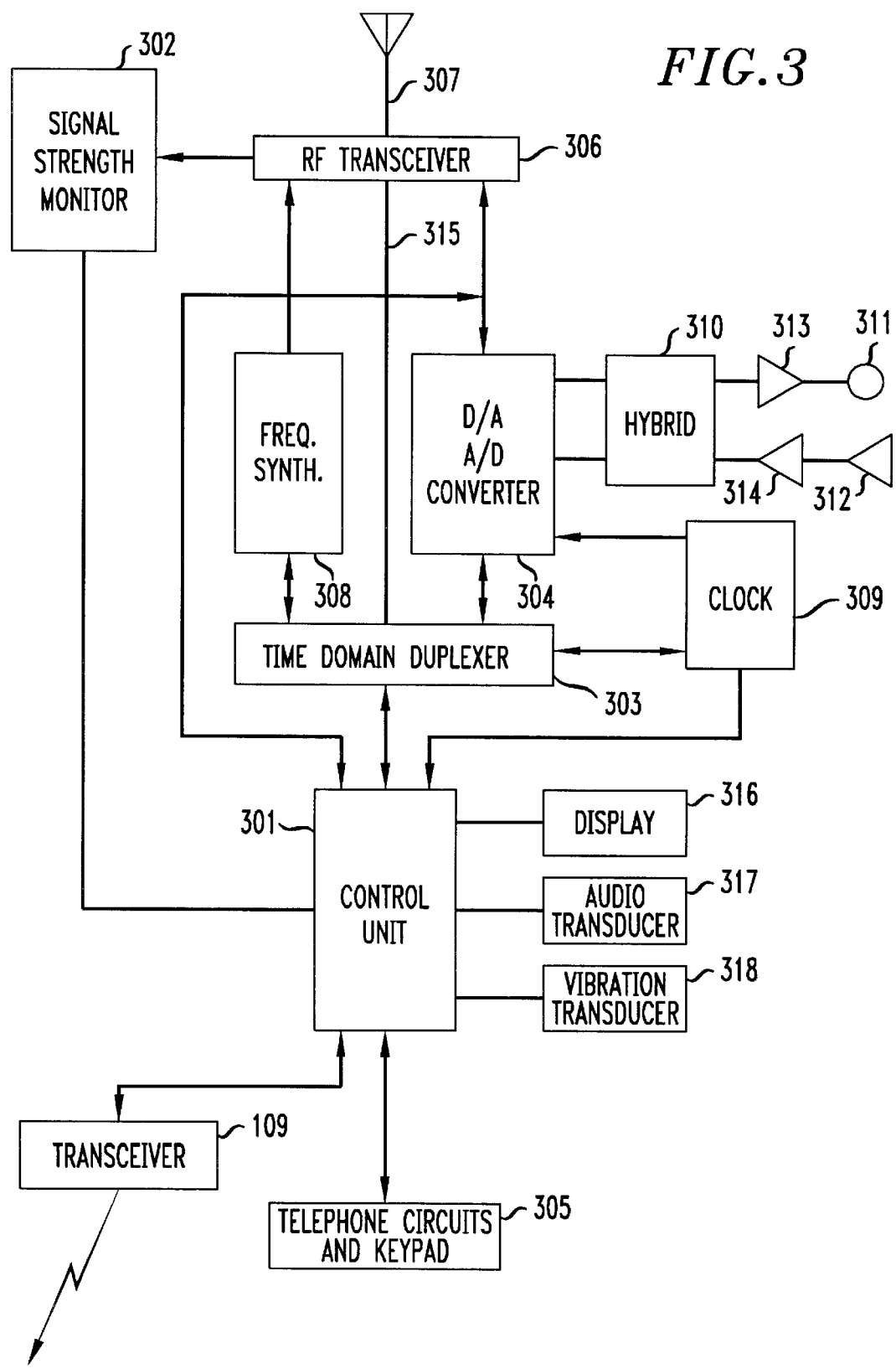
FIG. 3 illustrates, in block diagram form, a wireless terminal.

Wireless handset 101 is illustrated in greater detail in FIG. 3. Wireless handset 101 implements a wireless protocol that allows wireless handset 101 to maintain a wireless signal link with wireless telecommunication switching system 201 via base stations included in wireless telecommunication switching system 201. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless handset is provided by control unit 301. Units 302, 303, 306, 307, 308, and 309 provide the RF communication capabilities for the wireless handset. Elements 304, 310, and 311–314 provide the audio information received and transmitted to the user; whereas, elements 316–318 and 305 provide the basic user interface.

The data and voice information is transmitted or received directly from RF transceiver 306 by control unit 301 and is communicated with auxiliary desktop unit 102 via transceiver 109. One skilled in the art could readily see that this information could be directly received by transceiver 109 from RF transceiver 306. Transceiver 109 would then form this information into the two data channels assigned to communication of voice and data information on the infra-red link. Note, that in the PHS protocol, control unit 301 would have to request one or more bearer channels to provide a channel for the data information that was being communicated with wireless telecommunication switching system 201. It is well known by one skilled in the art how these additional bearer channels are obtained in the PHS protocol.

Control unit 301 is responsive to control messages received from wireless telecommunication switching system 201 to extract the INFO elements that define what indicators are to be controlled and the information to be displayed on display 112. Control unit 301 then communicates this information to processor 204 via the infra-red link. Similarly, control unit 301 is responsive to messages from processor 204 defining button actuations on auxiliary desktop unit 102 to encode this information into INFO elements of PHS messages and to transmit those messages to wireless telecommunication switching system 201. In addition, control unit 301 continuously monitors whether or not it is in communication with processor 204. If control unit 301 is in communication with processor 204, it sends control information for the indicators and display received from wireless telecommunication switching system 201 to processor 204. In addition, control unit 301 continuously stores the status of the display and indicators of auxiliary desktop unit 102. If control unit 301 is not in communication with processor 204, it continues to store information. When communication is established with processor 204, the stored information is communicated to processor 204 so that it can properly update the display and indicators.

The advantage of controller 301 operating in this manner is that the system controller of wireless telecommunication system 201 does not have to be programmed to take into account when auxiliary telephone unit 102 is in communication with wireless terminal 101. More importantly, the system controller of wireless telecommunication system 201 does not have to maintain a record and then update auxiliary telephone unit 102. Controller 301 is not only programmed to properly update the display and indicators of auxiliary telephone unit 102 but also using well-known techniques processor 301 updates the display of wireless terminal 101.

Figure 4:
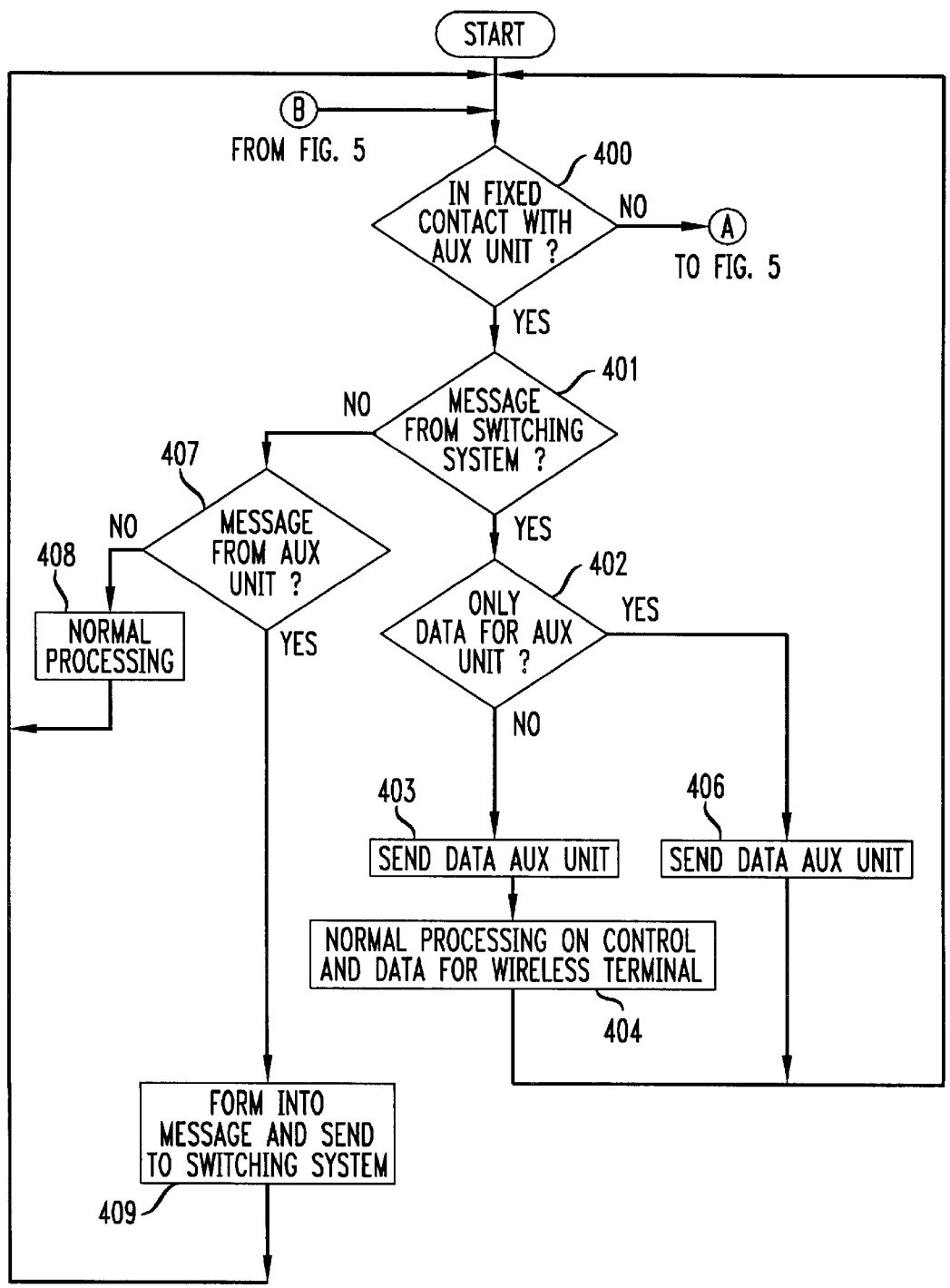
FIGS. 4 and 5 illustrate, in flow chart form, steps performed by a wireless terminal.
Figure 5:
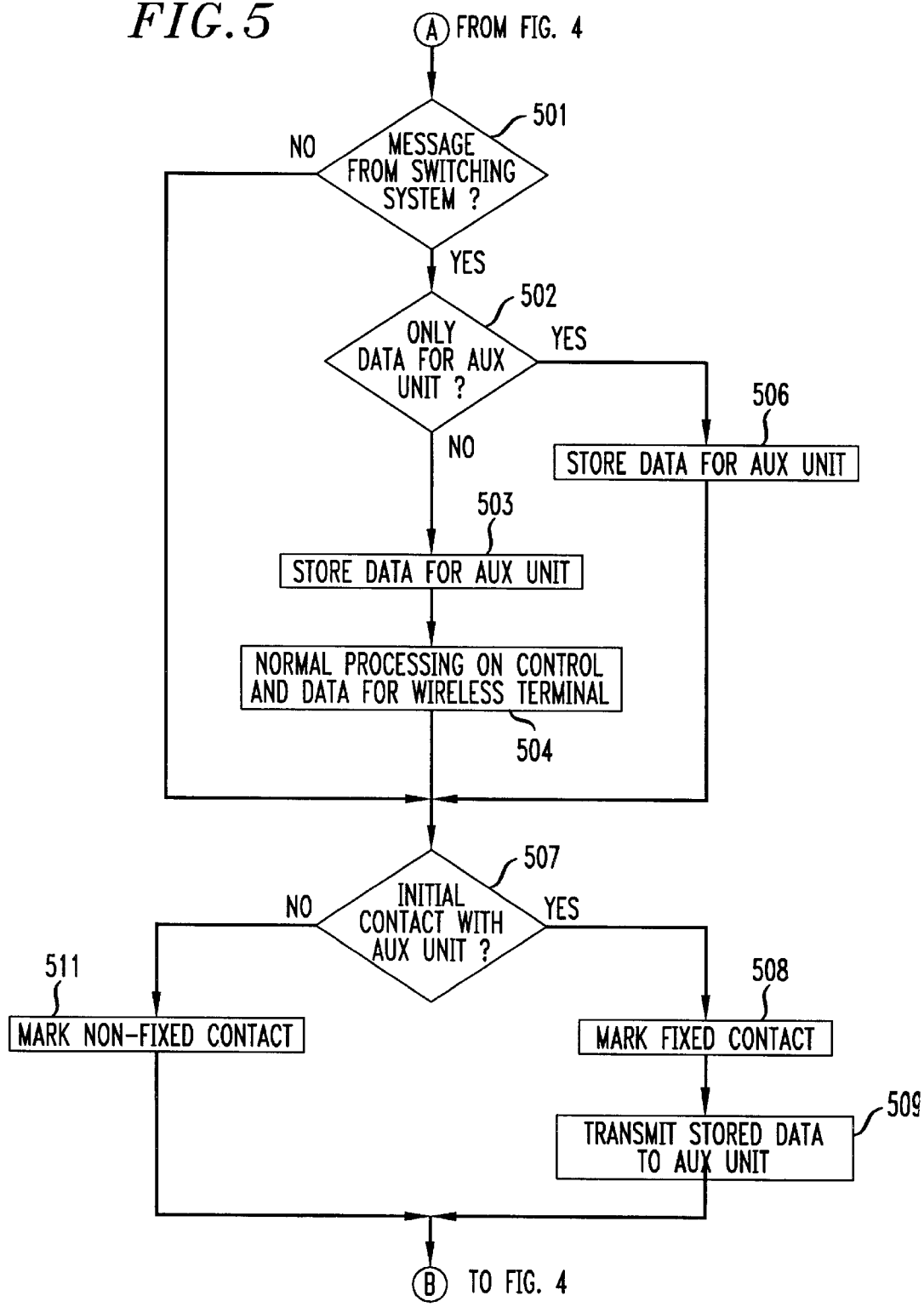

FIGS. 4 and 5 illustrate the steps performed by a wireless terminal. Decision block 400 determines if the wireless terminal is in fixed contact with the auxiliary desktop unit. Fixed contact means that contact via the infra-red link had been previously established after having been lost. If the answer is yes, control is transferred to decision block 401 which determines if there is a message from the wireless telecommunication switching system. If the answer is yes, decision block 402 determines whether this message contains data that is only intended to control some function on the auxiliary desktop unit. Such data would be contained within a INFO element. If the answer in decision block 402 is yes, the data contained in the INFO element is transmitted to the auxiliary desktop unit by block 406 before returning control to decision block 400. If the answer in decision block 402 is no, any data destined for the auxiliary desktop unit is transmitted to the auxiliary desktop unit by block 403. Block 404 then performs normal processing of control and data intended for utilization by the wireless terminal before returning control to decision block 400.

Returning to decision block 401, if the answer is no, decision block 407 determines if there is a message from the auxiliary desktop unit. If the answer is no, block 408 performs normal processing before returning control to decision block 400. If the answer in decision block 407 is yes, the information in the message from auxiliary desktop unit 409 is formed into INFO elements of a message which is sent to the wireless telecommunication switching system before returning control to decision block 400.

Returning to decision block 400, if the wireless terminal is not in fixed contact with the auxiliary desktop unit, control is transferred to decision block 501 of FIG. 5. Decision block 501 determines if there is a message from the wireless telecommunication switching system. If the answer is yes, decision block 502 determines if the message consists of data intended only for the auxiliary desktop unit. If the answer is yes in decision block 502, block 506 stores the data for the auxiliary desktop unit and transfers control to decision block 507. The stored data will be transmitted to the auxiliary desktop unit when initial contact is made with the auxiliary desktop unit. These operations are described with respect to blocks 507–509. Returning to decision block 502, if the answer is no, block 503 stores any data in the message that was intended for the auxiliary desktop unit before transferring control to block 504. The latter block performs normal processing on any control and data that was intended for the wireless terminal.

After execution of block 504, control is transferred to decision block 507 which determines if initial contact has been established with the auxiliary desktop unit. If the answer is yes, block 508 marks the fact that fixed contact has now been established with the auxiliary desktop unit, and block 509 transmits to the auxiliary desktop unit of all stored data. After execution of block 509, control is transferred to decision block 400 of FIG. 4. If the answer in decision block 507 is no, block 511 marks that non-fixed contact is present with respect to the auxiliary desktop unit before transferring control to decision block 400 of FIG. 4. Returning to decision block 501, if the answer in decision block 501 is no, control is transferred to decision block 507.

Figure 6:
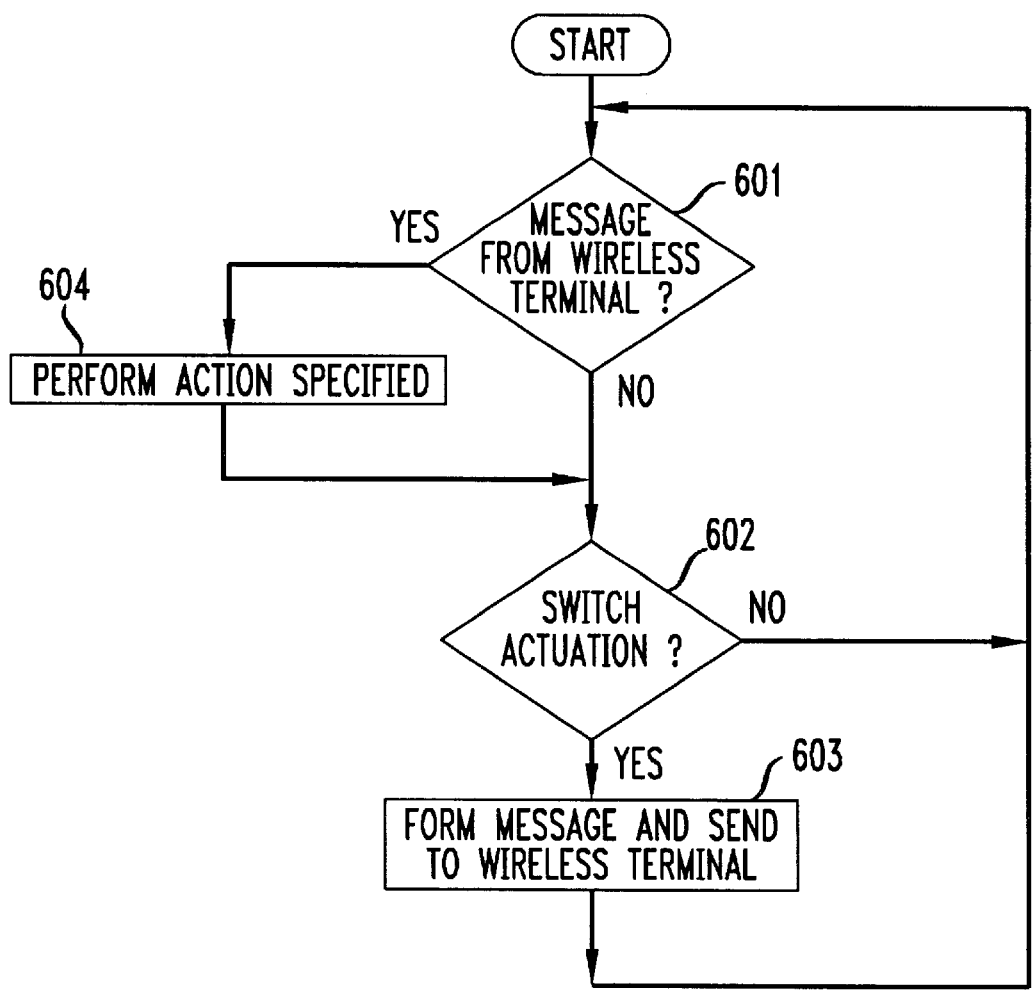
FIG. 6 illustrates, in flow chart form, steps performed by an auxiliary desktop unit.

FIG. 6 illustrates the steps performed by processor 204 of auxiliary desktop unit 102. Decision block 601 determines if a message has been received from the wireless terminal. If the answer is no, control is transferred to decision block 602. If the answer is yes in decision block 601, control is transferred to block 604 which performs the action specified in the message before transferring control to decision block 602. Decision block 602 determines if there has been any type of switch actuation on the auxiliary desktop unit. If the answer is no, control is transferred back to decision block 601. If the answer is yes in decision block 602, block 603 forms a message specifying the switch actuation and sends this message to the wireless terminal before transferring control back to decision block 601.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

What is claimed is:

1. An apparatus providing both mobile and fixed location telecommunication services via a wireless switching system, comprising:

an auxiliary fixed unit for providing a plurality of telecommunication feature functions;

a wireless terminal connecting to the wireless switching system via a first wireless link and to the auxiliary fixed unit via a second wireless link with all telecommunication information to or from the auxiliary fixed unit being communicated via the second wireless link and the wireless terminal;

a first controller in the wireless terminal responsive to first ones of telecommunication control messages from the wireless switching system for transmitting ones of a second type of control messages to the auxiliary fixed unit;

a second controller in the auxiliary fixed unit responsive to the ones of the second type of control messages for controlling ones of the plurality of telecommunication feature functions;

the second controller responsive to actuation of other ones of the plurality of telecommunication feature functions by a user on the auxiliary fixed unit for transmitting ones of a third type of control messages to wireless terminal; and the first controller responsive to the ones of the third type of control messages for transmitting second ones of the telecommunication control messages to the wireless switching system.

2. The apparatus of claim 1 wherein the wireless terminal comprises a transceiver connected to the second wireless link for detecting a loss of the second wireless link; and the first controller responsive to the loss of the second wireless link and receipt of third ones of telecommunication control messages from the wireless switching system for storing other ones of the second type of control messages.

3. The apparatus of claim 2 wherein the transceiver further detecting the restoration of the second wireless link and the first controller responsive to the detection of restoration for transmitting the stored other ones of the second type of control messages to the auxiliary fixed unit.

4. The apparatus of claim 3 wherein the wireless terminal responsive to voice information from the wireless switching system for communicating the voice information via the second wireless link; and the auxiliary fixed unit comprises an interface for connecting to the second wireless link and transferring the communicated voice information to an auxiliary audio device.

5. The apparatus of claim 4 wherein the auxiliary fixed unit transferring other voice information from the auxiliary audio device to the wireless terminal; and the wireless terminal responsive to the other voice information from the auxiliary fixed unit for communicating the other voice information via the first wireless link to the wireless switching system.

6. The apparatus of claim 5 wherein the auxiliary device is a speakerphone.

7. The apparatus of claim 5 wherein the auxiliary device is a headset.

8. The apparatus of claim 7 wherein the second wireless link is an infra-red wireless link.

9. A wireless terminal for providing both wireless and desktop functions, comprising:

a circuit for receiving first ones of a plurality of wireless control messages from a wireless switching system via a first wireless link;

a controller for translating ones of the received first ones of the plurality of wireless control messages to ones of a first type of control messages; and a transmitter under control of the controller for transmitting the ones of the first type of control messages to an auxiliary fixed unit via a second wireless link wherein the ones of the first type of control messages specify ones of a plurality of telecommunication feature functions to be performed on the auxiliary fixed unit with all telecommunication information to or from the auxiliary fixed unit being communicated via the second wireless link and the wireless terminal;

a receiver for receiving ones of a second type of control messages from the auxiliary fixed unit via the second wireless link wherein the ones of the second type of control messages define user actions on the auxiliary fixed unit;

the controller responsive to the received ones of the second type of control messages for further translating the received ones of the second type of control messages to second ones of the plurality of the wireless control messages; and a circuit for transmitting the second ones of the plurality of wireless control messages to the wireless switching system.

10. The wireless terminal of claim 9 wherein the receiver for receiving ones of a second type of control messages further detecting the loss of the second wireless link; and the controller further responsive to the detection of the loss of the second wireless link and receipt of third ones of the plurality of wireless control messages for storing other ones of the first type of control messages.

11. The wireless terminal of claim 10 wherein the receiver for receiving ones of a second type of control messages further detecting the restoration of the second wireless link; and the controller further responsive to the restoration of the second wireless link for transmitting the stored other ones of the first type of control messages to the auxiliary fixed unit.

12. A method providing both mobile and fixed location telecommunication services via a wireless terminal, an auxiliary fixed unit, and a wireless switching system, comprising the steps of:

providing a plurality of telecommunication feature functions by the auxiliary fixed unit;

connecting to the wireless switching system via a first wireless link and to the auxiliary fixed unit via a second wireless link by the wireless terminal with all telecommunication information to or from the auxiliary fixed unit being communicated via the second wireless link and the wireless terminal;

transmitting ones of a second type of control messages to the auxiliary fixed unit by the wireless terminal in response to first ones of telecommunication control messages from the wireless switching system;

controlling ones of the plurality of telecommunication feature functions by the auxiliary fixed unit in response to the ones of the second type of control messages;

transmitting ones of a third type of control messages to wireless terminal from the auxiliary fixed unit in response to actuation of other ones of the plurality of telecommunication feature functions by a user on the auxiliary fixed unit; and transmitting second ones of the telecommunication control messages to the wireless switching system by the wireless terminal in response to the ones of the third type of control messages.

13. The method of claim 12 further comprises the steps of detecting a loss of the second wireless link by the wireless terminal; and storing other ones of the second type of control messages by the wireless terminal in response to the loss of the second wireless link and receipt of third ones of telecommunication control messages from the wireless switching system.

14. The method of claim 13 further comprises the steps of detecting the restoration of the second wireless link by the wireless terminal; and transmitting the stored other ones of the second type of control messages to the auxiliary fixed unit by the wireless terminal in response to the detection of restoration for.

15. The method of claim 14 further comprises the steps of communicating voice information via the second wireless link by the wireless terminal in response to voice information from the wireless switching system; and transferring the communicated voice information to an auxiliary audio device by the auxiliary fixed unit.

16. The method of claim 15 further comprises the steps of transferring other voice information from the auxiliary audio device to the wireless terminal by the auxiliary fixed unit; and communicating the other voice information via the first wireless link to the wireless switching system by the wireless terminal in response to the other voice information from the auxiliary fixed unit.

17. The method of claim 16 wherein the auxiliary device is a speakerphone.

18. The method of claim 16 wherein the auxiliary device is a headset.

19. The method of claim 18 wherein the second wireless link is an infra-red wireless link.

20. A method for providing both wireless and desktop functions by wireless terminal, comprising the steps of:

receiving first ones of a plurality of wireless control messages from a wireless switching system via a first wireless link;

translating ones of the received first ones of the plurality of wireless control messages to ones of a first type of control messages; and transmitting the ones of the first type of control messages to an auxiliary fixed unit via a second wireless link wherein the ones of the first type of control messages specify ones of a plurality of telecommunication feature functions to be performed on the auxiliary fixed unit with all telecommunication information to or from the auxiliary fixed unit being communicated via the second wireless link and the wireless terminal;

receiving ones of a second type of control messages from the auxiliary fixed unit via the second wireless link wherein the ones of the second type of control messages define user actions on the auxiliary fixed unit;

further translating the received ones of the second type of control messages to second ones of the plurality of the wireless control messages; and transmitting the second ones of the plurality of wireless control messages to the wireless switching system.

21. The method of claim 20 further comprises the steps of detecting the loss of the second wireless link; and storing other ones of the first type of control messages in response to the detection of the loss of the second wireless link and receipt of third ones of the plurality of wireless control messages.

22. The method of claim 21 further comprises the steps of receiving ones of a second type of control messages further detecting the restoration of the second wireless link; and transmitting the stored other ones of the first type of control messages to the auxiliary fixed unit in response to the restoration of the second wireless link.

* * * * *